United States Patent
Guen et al.

(10) Patent No.: US 8,765,279 B2
(45) Date of Patent: Jul. 1, 2014

(54) SECONDARY BATTERY WITH INJECTION INLET INCLUDING A BLOCKING MEMBER

(75) Inventors: Minhyung Guen, Yongin-si (KR); Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 594 days.

(21) Appl. No.: 13/064,142

(22) Filed: Mar. 8, 2011

(65) Prior Publication Data
US 2012/0107653 A1    May 3, 2012

(30) Foreign Application Priority Data

Nov. 2, 2010    (KR) .................. 10-2010-0108001

(51) Int. Cl.
H01M 2/12    (2006.01)
H01M 2/36    (2006.01)
H01M 2/00    (2006.01)

(52) U.S. Cl.
USPC ............... 429/89; 429/79; 429/82; 429/163; 215/316

(58) Field of Classification Search
None
See application file for complete search history.

(56) References Cited

U.S. PATENT DOCUMENTS

| 4,329,405 | A | * | 5/1982 | Zupancic ..................... 429/56 |
| 4,750,525 | A | * | 6/1988 | Vaughan ....................... 138/89 |
| 6,190,798 | B1 | * | 2/2001 | Okada et al. ................. 429/163 |
| 2010/0003583 | A1 | | 1/2010 | Seong et al. |
| 2010/0330417 | A1 | | 12/2010 | Kim et al. |

FOREIGN PATENT DOCUMENTS

| EP | 1156540 | * 11/2001 | ............. H01M 2/12 |
| JP | 11-273638 A | 10/1999 | |
| KR | 10 2006-0112745 A | 11/2006 | |
| KR | 10 2006-0118115 A | 11/2006 | |
| KR | 10-2006-0118297 A | 11/2006 | |
| KR | 10-2007-0005338 A | 1/2007 | |
| KR | 10-2010-0004299 A | 1/2010 | |

OTHER PUBLICATIONS

Korean Office Action in KR 10-2010-0108001, dated Jan. 30, 2012 (Guen, et al.).

* cited by examiner

*Primary Examiner* — Kwang Han
(74) *Attorney, Agent, or Firm* — Lee & Morse, P.C.

(57) ABSTRACT

A secondary battery including an electrode assembly, the electrode assembly including a first electrode plate, a separator, and a second electrode plate; a collecting plate electrically connected to the electrode assembly; a case accommodating the electrode assembly and the collecting plate; a cap plate sealing the case; and an electrode terminal passing through the cap plate and electrically connected to the collecting plate, wherein the cap plate includes an injection inlet at a side thereof, the injection inlet includes a blocking member therein, and the blocking member and the injection inlet are covered with a stopper.

18 Claims, 5 Drawing Sheets

SECONDARY BATTERY WITH INJECTION INLET INCLUDING A BLOCKING MEMBER

BACKGROUND

1. Field

Embodiments relates to a secondary battery.

2. Description of the Related Art

Secondary batteries are rechargeable, unlike primary batteries. Secondary batteries may include a low capacity battery including a battery cell in the form of a pack and may be used for small portable electronic devices, e.g., cellular phones and camcorders. Secondary batteries may include a high capacity battery including dozens of battery cells connected to one another and may be used as a motor-driving power source for, e.g., electric scooters, hybrid vehicles, or electric vehicles.

Secondary batteries may be manufactured in various shapes, e.g., a cylindrical shape and a prismatic shape. A secondary battery may be constructed as follows: an electrode assembly formed by interposing an insulating separator between a positive electrode plate and a negative electrode plate may be placed in a case together with electrolyte; and a cap plate may be disposed on the case. The electrode assembly may be connected to positive and negative terminals, which may protrude from the cap plate and may be exposed to the exterior of the electrode assembly.

SUMMARY

Embodiments are directed to a secondary battery.

The embodiments may be realized by providing a secondary battery including an electrode assembly, the electrode assembly including a first electrode plate, a separator, and a second electrode plate; a collecting plate electrically connected to the electrode assembly; a case accommodating the electrode assembly and the collecting plate; a cap plate sealing the case; and an electrode terminal passing through the cap plate and electrically connected to the collecting plate, wherein the cap plate includes an injection inlet at a side thereof, the injection inlet includes a blocking member therein, and the blocking member and the injection inlet are covered with a stopper.

The blocking member may include one of polypropylene and polyurethane.

The blocking member may have a hardness of about 40 HRC to about 50 HRC in Rockwell C scale hardness.

The injection inlet may include an upper ridge at an upper surface of the cap plate and a lower ridge at a lower surface of the cap plate.

The injection inlet may further include a receiving groove between the cap plate and the upper ridge.

The upper ridge may include a thread thereon.

The thread may be wrapped with a tape.

The injection inlet may include an upper hole and a lower hole, the upper hole and the lower hole being connected to each other.

The injection inlet may further include a lip between the upper and lower holes.

The blocking member may be accommodated on the lip.

The stopper may include a metal or a plastic material.

The stopper may include an upper cover and a lateral cover.

The upper cover may include a protrusion on a lower side thereof.

The protrusion may contact the blocking member.

The protrusion may be coupled to an upper hole of the injection inlet.

The lateral cover may include a thread on an inner surface thereof.

The thread of the lateral cover may have a shape corresponding to a thread on an upper ridge of the injection inlet.

The upper cover may include a groove on a top surface thereof.

The blocking member may contact a protrusion of the stopper, and the blocking member may be accommodated by an upper hole, a lower hole, and a lip of the injection inlet.

The stopper may be screw-coupled with the injection inlet.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
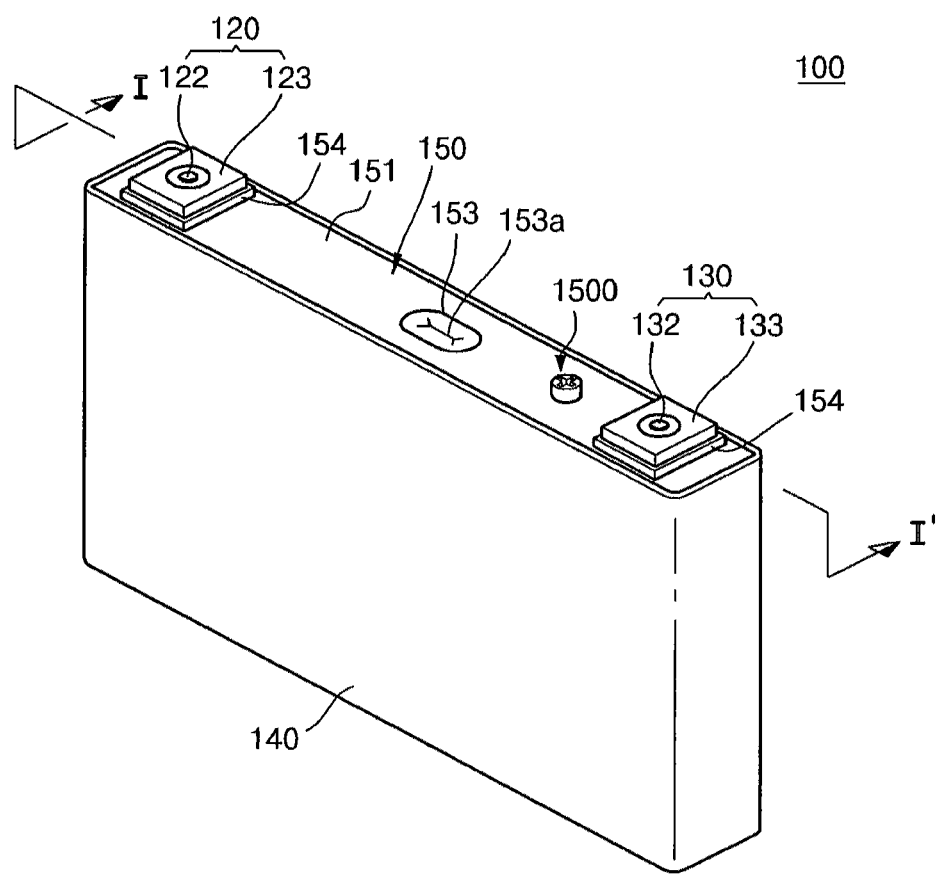
FIG. 1 illustrates a perspective view of a secondary battery according to an embodiment.

Korean Patent Application No. 10-2010-0108001 filed on Nov. 2, 2010, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Hereinafter, a secondary battery will be described with reference to the accompanying drawings according to exemplary embodiments.

First, a secondary battery will be described according to an embodiment.

Figure 2:
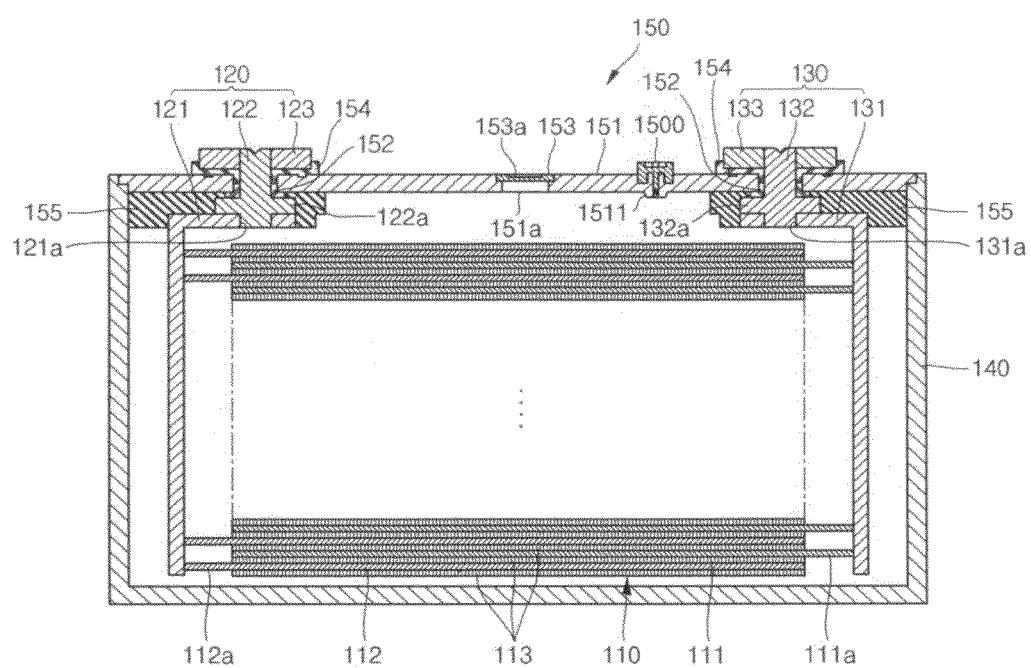
FIG. 2 illustrates a cross-sectional view taken along line I-I' of FIG. 1.
Figure 3A:
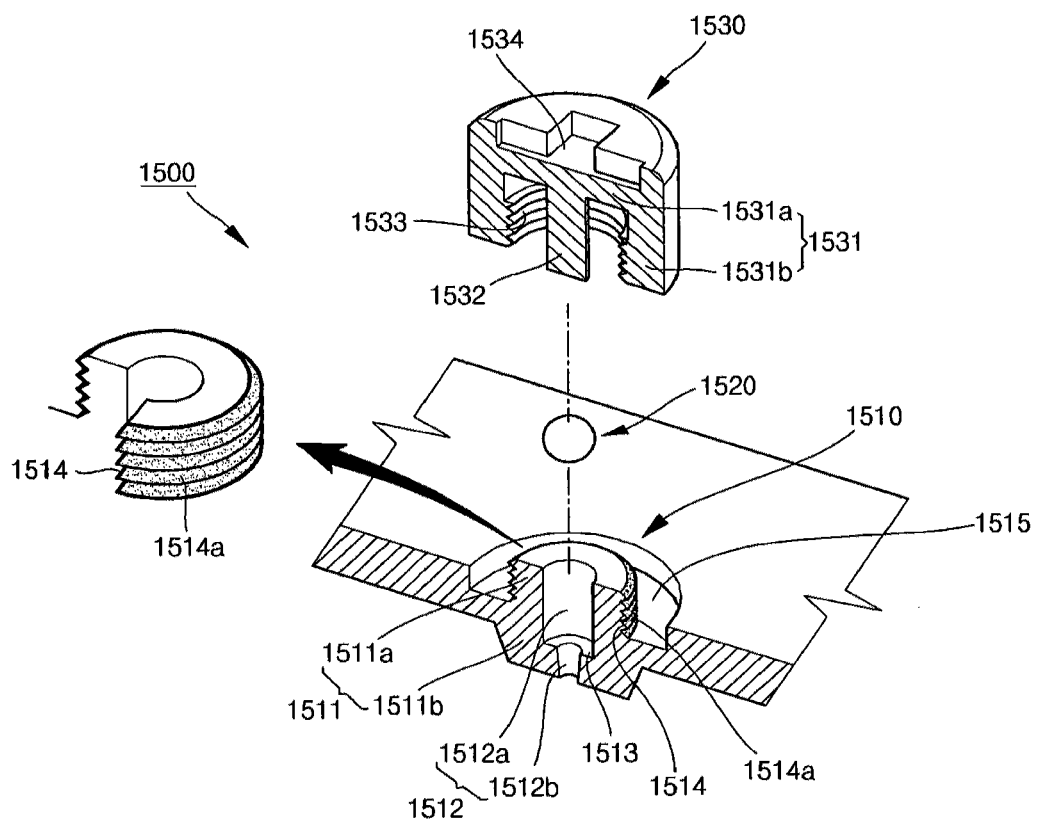
FIGS. 3A through 3C illustrate sectional views of an electrolyte injection structure.
Figure 3B:
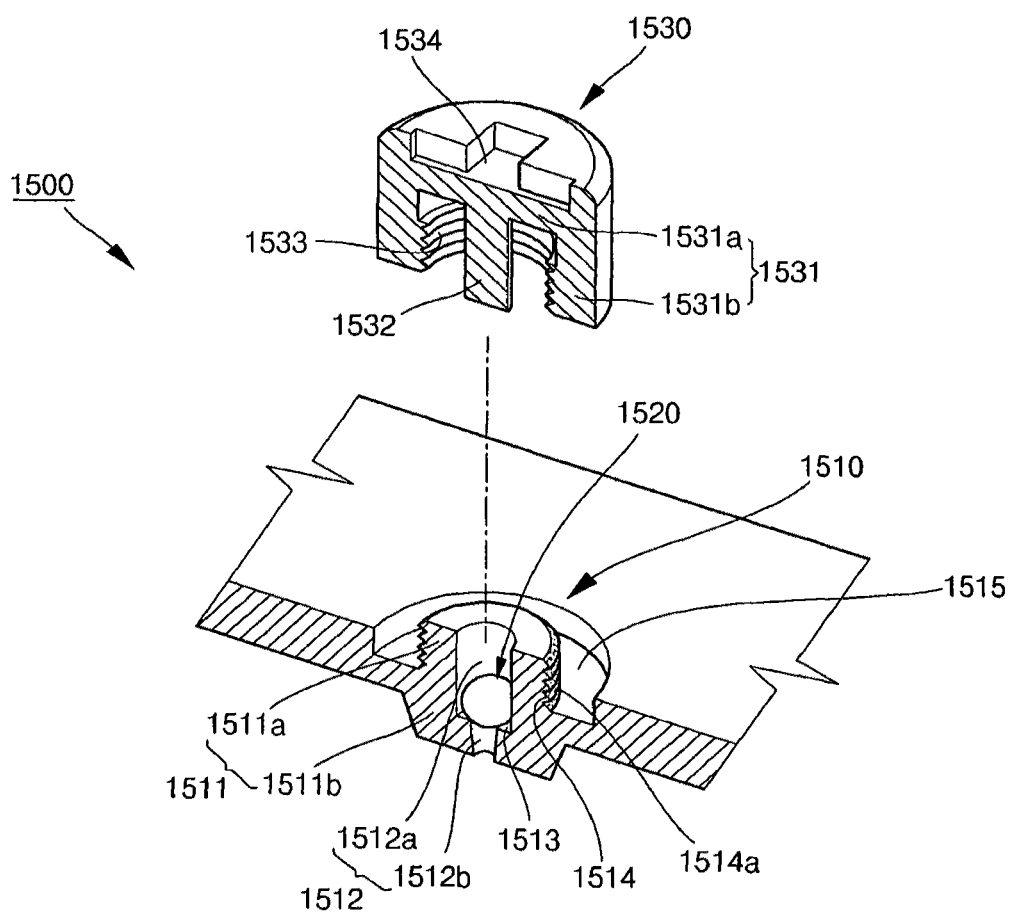
Figure 3C:
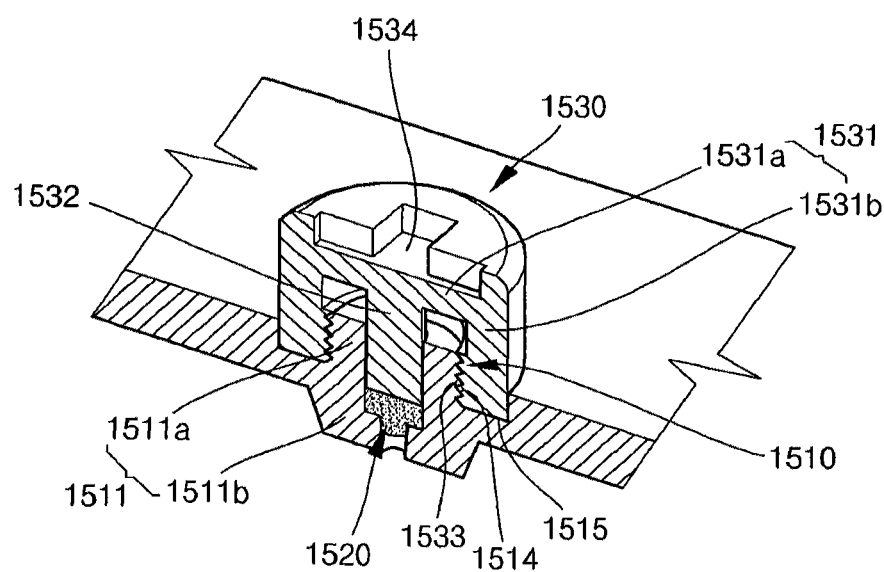

FIG. 1 illustrates a perspective view of a secondary battery according to an embodiment. FIG. 2 illustrates a cross-sectional view taken along line I-I' of FIG. 1. FIGS. 3A through 3C illustrate sectional views of an electrolyte injection structure.

Referring to FIGS. 1 through 3C, a secondary battery 100 of the present embodiment may include an electrode assembly 110, a first electrode terminal 120, a second electrode terminal 130, a case 140, and a cap assembly 150.

The electrode assembly 110 may be formed by winding or stacking a first electrode plate 111, a separator 113, and a second electrode plate 112, which may have a thin plate or film shape. The first electrode plate 111 may function as a negative electrode; and the second electrode plate 112 may function as a positive electrode. However, the first electrode plate 111 and the second electrode plate 112 may function oppositely, depending on a charging/discharging condition of the secondary battery 100.

The first electrode plate 111 may be formed by applying a first electrode active material, e.g., graphite or carbon, to a first electrode collector formed of metal foil, e.g., nickel or copper foil. The first electrode plate 111 may include a first electrode non-coating portion 111a to which the first electrode active metal is not applied. The first electrode non-coating portion 111a may function as a current flow passage between the first electrode plate 111 and an outside of the first electrode plate 111. In the current embodiment, materials that may be used to form the first electrode plate 111 are not limited to the above-mentioned materials.

The second electrode plate 112 may be formed by applying a second electrode active material, e.g., a transition metal oxide, to a second electrode collector formed of metal foil, e.g., aluminum foil. The second electrode plate 112 may include a second electrode non-coating portion 112a to which the second electrode active metal is not applied. The second electrode non-coating portion 112a may function as a current flow passage between the second electrode plate 112 and an outside of the second electrode plate 112. In the current embodiment, materials that may be used to form the second electrode plate 112 are not limited to the above-mentioned materials.

The polarities of the first and second electrode plates 111 and 112 may be changed with each other, e.g., the electrode plates may reverse polarities depending on a charging/discharging condition of the secondary battery 100.

The separator 113 may be between the first electrode plate 111 and the second electrode plate 112 to prevent a short circuit and facilitate movement of lithium ions. The separator 113 may be formed of, e.g., a polyethylene film, a polypropylene film, and/or a film including polyethylene and polypropylene. In the current embodiment, materials that may be used to form the separator 113 are not limited to the above-mentioned materials.

The first and second electrode terminals 120 and 130 may be coupled to end parts of the electrode assembly 110 in a manner such that the first and second electrode terminals 120 and 130 are electrically connected to the first and second electrode plates 111 and 112, respectively.

The electrode assembly 110 may be accommodated in the case 140 together with electrolyte. The electrolyte may include an organic solvent, e.g., ethylene carbonate (EC), propylene carbonate (PC), diethyl carbonate (DEC), ethyl methyl carbonate (EMC), and dimethyl carbonate (DMC), and a lithium salt, e.g., $LiPF_6$ or $LiBF_4$. The electrolyte may be liquid, solid, or gel.

The first electrode terminal 120 may be formed of a metal or an equivalent thereof and may be electrically connected to the first electrode plate 111. The first electrode terminal 120 may include a first collecting plate 121, a first terminal column 122, and a first terminal plate 123.

The first collecting plate 121 may contact the first electrode non-coating portion 111a at an end of the electrode assembly 110. In an implementation, the first collecting plate 121 may be welded to the first electrode non-coating portion 111a. The first collecting plate 121 may have an approximately reverse L-shape; and a terminal hole 121a may be formed in the upper portion of the first collecting plate 121. The first terminal column 122 may be fitted in the terminal hole 121a. For example, the first collecting plate 121 may be formed of copper or a copper alloy. However, the material of the first collecting plate 121 is not limited thereto.

The first terminal column 122 may penetrate a cap plate 151 and may protrude upwardly therefrom by a predetermined length. The first terminal column 122 may be electrically connected to the first collecting plate 121 at a lower side of the cap plate 151. The first terminal column 122 may extend and protrude upward from the cap plate 151 by a predetermined length. In addition, the first terminal column 122 may include a flange 122a at a position under the cap plate 151 so that the first terminal column 122 may not be separated from the cap plate 151. A part of the first terminal column 122 lower than the flange 122a may be inserted in the terminal hole 121 a of the first collecting plate 121. Thus, the first terminal column 122 may be electrically insulated from the cap plate 151. In an implementation, the first terminal column 122 may be formed of, e.g., copper or a copper alloy. However, the material of the first terminal column 122 is not limited thereto.

The first terminal plate 123 may have a hexahedral shape; and a hole may be formed in a center portion of the first terminal plate 123. The first terminal plate 123 may be coupled to the first terminal column 122. For example, the first terminal column 122 may be coupled to the hole of the first terminal plate 123. After the first terminal plate 123 is coupled to the first terminal column 122, an upper part of the first terminal column 122 may be riveted. Thus, the first terminal plate 123 may be fixed to the first terminal column 122. For example, the first terminal plate 123 may be formed of copper or a copper alloy. However, the material of the first terminal plate 123 is not limited thereto. The first terminal plate 123 and the cap plate 151 may be insulated from each other.

The second electrode terminal 130 may be formed of a metal or an equivalent thereof. The second electrode terminal 130 may be electrically connected to the second electrode plate 112. The second electrode terminal 130 may include a second collecting plate 131, a second terminal column 132, and a second terminal plate 133.

The second electrode terminal 130 may have the same shape as that of the first electrode terminal 120. Thus, the shape of the second electrode terminal 130 will not described again. The second collecting plate 131 may contact the second electrode non-coating portion 112a protruding from an end of the electrode assembly 110. The second collecting plate 131 may be welded to the second electrode non-coating portion 112a. The second collecting plate 131 may have an approximately reverse L-shape; and a terminal hole 131a may be formed in the upper portion of the first collecting plate 131. The second terminal column 132 may be fitted in the terminal hole 131a. In an implementation, the second collecting plate 131 may be formed of, e.g., copper or a copper alloy. However, the material of the second collecting plate 131 is not limited thereto.

The second terminal column 132 may penetrate the cap plate 151 and may protrude upwardly therefrom by a predetermined length. The second terminal column 132 may be electrically connected to the second collecting plate 131 at the lower side of the cap plate 151. The second terminal column 132 may extend and protrude upward from the cap plate 151 by a predetermined length. In addition, the second terminal column 132 may include a flange 132a at a position under the cap plate 151 so that the second terminal column 132 may not be separated from the cap plate 151. A part of the second terminal column 132 lower than the flange 132a may be inserted in the terminal hole 131a of the second collecting plate 131. Thus, the second terminal column 132 may be electrically insulated from the cap plate 151. In an implementation, the second terminal column 132 may be formed of, e.g., copper or a copper alloy. However, the material of the second terminal column 132 is not limited thereto.

The second terminal plate 133 may have a hexahedral shape; and a hole may be formed in a center portion of the first terminal plate 133. The second terminal plate 133 may be coupled to the second terminal column 132. For example, the second terminal column 132 is coupled to the hole of the second terminal plate 133. After the second terminal plate 133 is coupled to the second terminal column 132, an upper part of the second terminal column 132 may be riveted. Thus, the second terminal plate 133 may be fixed to the second terminal column 132. In an implementation, the second terminal plate 133 may be formed of, e.g., copper or a copper alloy. However, the material of the second terminal plate 133 is not limited thereto. In addition, the second terminal plate 133 may be electrically connected to the cap plate 151. Thus, the case 140 and the cap plate 151 (that will be described below in detail) may have the same polarity (e.g., positive polarity) as that of the second electrode terminal 130.

The case 140 may be formed of a conductive metal, e.g., aluminum, aluminum alloy, and/or steel plated with nickel. The case 140 may have an approximately hexahedral shape with an opening so that the electrode assembly 110, the first electrode terminal 120, and the second electrode terminal 130 may be inserted and placed in the case 140. In FIG. 2, illustrating a state where the case 140 and the cap assembly 150 are coupled to each other, the opening of the case 140 is not shown. However, a peripheral part of the cap assembly 150 may substantially correspond to the opening. An inner surface of the case 140 may be treated to be electrically insulated from the electrode assembly 110, the first and second electrode terminals 120 and 130, and the cap assembly 150.

The cap assembly 150 may be coupled to the case 140. In an implementation, the cap assembly 150 includes the cap plate 151, sealing gaskets 152, a safety vent 153, upper insulation members 154, lower insulation members 155, and an electrolyte injection structure 1500. The sealing gaskets 152, the upper insulation members 154, and the lower insulation members 155 may be considered as elements of the first electrode terminal 120 and the second electrode terminal 130.

The cap plate 151 may close or seal the opening of the case 140, and may be formed of the same material as that used to form the case 140. For example, the cap plate 151 may be coupled to the case 140 by laser welding. As described above, the cap plate 151 may have the same polarity as that of the second electrode terminal 130. In this case, the cap plate 151 and the case 140 may have the same polarity.

The sealing gaskets 152 may be formed of an insulating material and may be disposed between the cap plate 151 and the first and second terminal columns 122 and 132 to seal the gaps between the cap plate 151 and the first and second terminal columns 122 and 132. The sealing gaskets 152 may prevent permeation of moisture into the secondary battery 100 and leakage of the electrolyte from the inside of the secondary battery 100.

The safety vent 153 may be disposed on a vent hole 151a of the cap plate 151; and a notch 153a may be formed in the safety vent 153 so that the safety vent 153 may be opened at a predetermined pressure.

The upper insulation members 154 may be disposed between the cap plate 151 and the first and second terminal plates 123 and 133. In addition, the upper insulation members 154 may closely contact the cap plate 151. Furthermore, the upper insulation members 154 may closely contact the sealing gaskets 152. The upper insulation members 154 may insulate the cap plate 151 from the first and second terminal plates 123 and 133.

The lower insulation members 155 may be disposed between the cap plate 151 and the first and second collecting plates 121 and 131 to prevent a short circuit. For example, the lower insulation members 155 may prevent a short circuit between the first collecting plate 121 and the cap plate 151 and a short circuit between the second collecting plate 131 and the cap plate 151. The lower insulation members 155 may also be disposed between the cap plate 151 and the first and second terminal columns 122 and 132 so that a short circuit may be prevented between the cap plate 151 and the first and second terminal columns 122 and 132.

The electrolyte injection structure 1500 may include an injection inlet 1510, a blocking member 1520, and a stopper 1530.

The injection inlet 1510 may be formed at a side of the cap plate 151. The injection inlet 1510 may include a ridge 1511, a hole 1512, a flat part or lip 1513, a thread 1514, and a receiving groove 1515. The injection inlet 1510 may be formed of polypropylene.

The ridge 1511 may include an upper ridge 1511a and a lower ridge 1511b. The thread 1514 may be formed on an outer surface of the upper ridge 1511a and may be wrapped with a tape 1514a to facilitate secure sealing and to prevent leakage of the electrolyte. The hole 1512 may be disposed in the ridge 1511. The hole 1512 may include an upper hole 1512a and a lower hole 1512b. The lip 1513 may be formed between the upper hole 1512a and the lower hole 1512b to accommodate the blocking member 1520 thereon. The receiving groove 1515 may be formed between the cap plate 151 and the upper ridge 1511a. The stopper 1530 (described in greater detail below) may be placed in the receiving groove 1515.

The blocking member 1520 may be placed on the lip 1513 while making contact with the upper hole 1512a of the injection inlet 1510. The blocking member 1520 may initially have a spherical shape. The blocking member 1520 may be formed of a material that does not react with the electrolyte, e.g., polypropylene or polyurethane. The blocking member 1520 may have a hardness of about 40 HRC to about 50 HRC (Rockwell C Scale hardness). Maintaining the hardness of the blocking member 1520 at about 40 HRC or greater may help ensure that the blocking member 1520 is not too soft to form a good seal, thereby preventing leakage of the electrolyte (not shown). Maintaining the hardness of the blocking member 1520 at about 40 HRC or greater may also help ensure the blocking member 1520 may be accommodated on the lip 1513, rather than being pressed or slid into the lower hole 1512b. Maintaining the hardness of the blocking member 1520 at about 50 HRC or less may help ensure that the blocking member 1520 is not too hard, thereby ensuring that the blocking member 1520 is deformable and strong coupling with the stopper 1530 may be achieved.

The stopper 1530 may include a cover 1531, a protrusion 1532, a thread 1533, and a groove 1534. The stopper 1530 may be brought into contact with the receiving groove 1515 and may be coupled to the thread 1514 of the injection inlet 1510 to seal the injection inlet 1510. For example, the stopper 1530 may be screw-coupled with the injection inlet 1510. In an implementation, the stopper 1530 may be formed of, e.g., a metal or plastic material.

The cover 1531 may include an upper cover 1531a and a lateral cover 1531b. The protrusion 1532 may be formed on a lower side of the upper cover 1531a; and the thread 1533 may be formed on an inner surface of the lateral cover 1531b. The protrusion 1532 may have a predetermined length so that the protrusion 1532 may contact the blocking member 1520 and fix a position of the blocking member 1520. The thread 1533 may have a shape corresponding to the shape of the thread 1514 of the injection inlet 1510. Thus, the thread 1533 may facilitate effective sealing of the injection inlet 1510. In an implementation, the groove 1534 may have a cross shape. Thus, the stopper 1530 may be coupled to the injection inlet 1510 by using, e.g., a Phillips screwdriver or any other tool suitable for the groove 1534. A shape of the groove 1534 or tools suitable for the groove 1534 are not limited to those described above.

Next, the electrolyte injection structure 1500 according to an embodiment will be described in greater detail.

As noted above, FIGS. 3A through 3C illustrate sectional views of the electrolyte injection structure 1500.

The injection inlet 1510 may be formed in a circular ring shape at a side of the cap plate 151; and the thread 1514 may be formed on the upper ridge 1511a. The spherical blocking member 1520 may be placed on the lip 1513 on an inner side of the injection inlet 1510; and the blocking member 1520 may contact the upper hole 1512a. As the protrusion 1532 on the stopper 1530 is brought into contact with the blocking member 1520, the blocking member 1520 may be deformed and may contact the upper hole 1512a, the lower hole 1512b, and the lip 1513.

When the blocking member 1520 is positioned, the stopper 1530 may contact the receiving groove 1515. The thread 1514 of the injection inlet 1510 may be wrapped with the tape 1514a so that the thread 1514 may be securely engaged with the corresponding thread 1533 formed on the stopper 1530. For example, as described above, the stopper 1530 may be screw coupled to the injection inlet 1510 and engaged therewith by way of the corresponding threads 1514 and 1533. As the stopper 1530 is screwed onto the injection inlet, the blocking member 1520 may conform to the shape of the upper hole 1512a, the lower hole 1512b, and the lip 1513, thereby ensuring a good seal.

By way of summation and review, a safety vent may be formed in the cap plate so that gas can be discharged through the safety vent when an inside pressure of the secondary battery exceeds a predetermined value. An injection inlet may be formed at a side of the cap plate to supply electrolyte into the case through the injection inlet. A ball or blocking member may be press-fitted to seal the injection inlet.

The embodiments provide a secondary battery in which a blocking member is inserted in a threaded injection inlet and then the injection inlet is secondarily sealed by a threaded stopper.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
    an electrode assembly, the electrode assembly including a first electrode plate, a separator, and a second electrode plate;
    a collecting plate electrically connected to the electrode assembly;
    a case accommodating the electrode assembly and the collecting plate;
    a cap plate sealing the case; and
    an electrode terminal passing through the cap plate and electrically connected to the collecting plate,
    wherein:
        the cap plate includes an injection inlet at a side thereof,
        the injection inlet includes a blocking member therein,
        the blocking member and the injection inlet are covered with a stopper,
        the injection inlet includes an upper ridge at an upper surface of the cap plate and a lower ridge at a lower surface of the cap plate, and
        the upper ridge includes a thread on an outer surface of the upper ridge.

2. The secondary battery as claimed in claim 1, wherein the blocking member is formed from one of polypropylene and polyurethane.

3. The secondary battery as claimed in claim 2, wherein the blocking member has a hardness of about 40 HRC to about 50 HRC in Rockwell C scale hardness.

4. The secondary battery as claimed in claim 1, wherein the injection inlet further includes a receiving groove between the cap plate and the upper ridge.

5. The secondary battery as claimed in claim 1, wherein the thread is wrapped with a tape.

6. The secondary battery as claimed in claim 1, wherein the injection inlet includes an upper hole and a lower hole, the upper hole and the lower hole being connected to each other.

7. The secondary battery as claimed in claim 6, wherein the injection inlet further includes a lip between the upper and lower holes.

8. The secondary battery as claimed in claim 7, wherein the blocking member is accommodated on the lip.

9. The secondary battery as claimed in claim 1, wherein the stopper is formed from a metal or a plastic material.

10. The secondary battery as claimed in claim 9, wherein the stopper includes an upper cover and a lateral cover.

11. The secondary battery as claimed in claim 10, wherein the upper cover includes a protrusion on a lower side thereof.

12. The secondary battery as claimed in claim 11, wherein the protrusion contacts the blocking member.

13. The secondary battery as claimed in claim 11, wherein the protrusion is coupled to an upper hole of the injection inlet.

14. The secondary battery as claimed in claim 10, wherein the lateral cover includes a thread on an inner surface thereof.

15. The secondary battery as claimed in claim 14, wherein the thread of the lateral cover has a shape corresponding to a thread on an upper ridge of the injection inlet.

16. The secondary battery as claimed in claim 10, wherein the upper cover includes a groove on a top surface thereof.

17. The secondary battery as claimed in claim 1, wherein:
    the blocking member contacts a protrusion of the stopper, and
    the blocking member is accommodated by an upper hole, a lower hole, and a lip of the injection inlet.

18. The secondary battery as claimed in claim 1, wherein the stopper is screw-coupled with the injection inlet.

* * * * *